(12) United States Patent
Klug et al.

(10) Patent No.: US 7,574,631 B2
(45) Date of Patent: Aug. 11, 2009

(54) CIRCUIT ARRANGEMENT AND METHOD FOR SECURE DATA PROCESSING

(75) Inventors: Franz Klug, Munich (DE); Steffen M. Sonnekalb, Taufkirchen (DE)

(73) Assignee: Infineon Technologies AG (DE)

( * ) Notice: Subject to any disclaimer, the term of this patent is extended or adjusted under 35 U.S.C. 154(b) by 618 days.

(21) Appl. No.: 11/355,907

(22) Filed: Feb. 15, 2006

(65) Prior Publication Data

US 2006/0259851 A1 Nov. 16, 2006

(30) Foreign Application Priority Data

Feb. 15, 2005 (DE) .................. 10 2005 006 832

(51) Int. Cl.
*G06F 11/10* (2006.01)
*G06F 11/30* (2006.01)

(52) U.S. Cl. .................. 714/51; 714/52; 714/807; 714/811

(58) Field of Classification Search .................. 714/51, 714/52, 807, 811
See application file for complete search history.

(56) References Cited

U.S. PATENT DOCUMENTS

| | | | | |
|---|---|---|---|---|
| 4,074,229 A | * | 2/1978 | Prey | 714/52 |
| 4,108,359 A | * | 8/1978 | Proto | 714/732 |
| 4,920,538 A | * | 4/1990 | Chan et al. | 714/38 |
| 5,091,910 A | * | 2/1992 | Ochi | 714/772 |
| 5,241,547 A | * | 8/1993 | Kim | 714/53 |
| 5,598,530 A | * | 1/1997 | Nagae | 714/21 |
| 5,740,360 A | * | 4/1998 | Huckstepp | 714/50 |
| 5,974,529 A | * | 10/1999 | Zumkehr et al. | 712/41 |
| 6,044,458 A | * | 3/2000 | Rinkenberger et al. | 712/227 |
| 6,389,539 B1 | * | 5/2002 | Hamilton et al. | 726/21 |
| 6,453,417 B1 | * | 9/2002 | Milios et al. | 726/27 |
| 6,543,012 B1 | * | 4/2003 | Viswanathan et al. | 714/50 |
| 6,625,688 B1 | * | 9/2003 | Fruehling et al. | 711/109 |
| 6,678,837 B1 | * | 1/2004 | Quach et al. | 714/38 |
| 6,708,231 B1 | * | 3/2004 | Kitagawa | 710/10 |
| 7,093,138 B2 | * | 8/2006 | Feilen et al. | 713/193 |
| 7,251,551 B2 | * | 7/2007 | Mitsueda et al. | 701/29 |
| 7,325,165 B2 | * | 1/2008 | Paaske | 714/38 |

FOREIGN PATENT DOCUMENTS

DE 101 45 621 A1 4/2003

* cited by examiner

*Primary Examiner*—Stephen M Baker
(74) *Attorney, Agent, or Firm*—Dickstein, Shapiro, LLP.

(57) ABSTRACT

Circuit arrangement for secure data processing for program data with a protected data record. An internal memory provides a protected data record having instruction words and a first check word associated with the instruction words. An arithmetic and logic unit has an input coupled to the internal memory and outputs the first check word from the applied protected data record. A checking apparatus has an input coupled between the internal memory and the arithmetic and logic unit, and allocates a second check word to the instruction words in the protected data record. A comparison apparatus has respective inputs coupled to the checking apparatus and the arithmetic and logic unit, and compares the first check word with the second check word, and outputs an alarm signal when the first check word does not match the second check word.

14 Claims, 5 Drawing Sheets

US 7,574,631 B2

CIRCUIT ARRANGEMENT AND METHOD FOR SECURE DATA PROCESSING

CROSS-REFERENCE TO RELATED APPLICATION

This application claims priority to German Patent Application Serial No. 102005006832.4, which was filed on Feb. 15, 2005 and is incorporated herein by reference in its entirety.

FIELD OF THE INVENTION

The invention relates to a circuit arrangement and a method for secure data processing and to the use thereof in line with the coordinate patent claims.

BACKGROUND OF THE INVENTION

Circuit arrangements for data processing essentially comprise an arithmetic and logic unit and a memory. The memory, to be more precise an "external memory", is used to store and provide program data. The program data are processed by the arithmetic and logic unit. This involves instruction words contained in the program data being executed by the arithmetic and logic unit. If appropriate, the arithmetic and logic unit generates control instructions in the course of the processing, and these are used to check and control further components in the circuit arrangement.

Besides the external memory, which is designed to store large volumes of data, the circuit arrangement comprises a further, internal memory, which is smaller and allows faster access. Data required for data processing are loaded into the internal memory so that they are available to the arithmetic and logic unit more quickly. For processing, the arithmetic and logic unit accesses the data provided in the internal memory. Between the internal memory and the arithmetic and logic unit there is frequently a decoding apparatus which is used to transform the stored instruction words into instruction words which can be processed by the arithmetic and logic unit directly. This makes sense to the extent that the instruction words stored in the internal memory do not necessarily have to be matched to the individual instruction set and to the architecture of the arithmetic and logic unit. This matching of the instruction words is performed by the decoding apparatus.

In chip card controllers, the external memory is frequently protected by an upstream cryptographical unit. In this case, the data are stored in the external memory in encrypted form. The cryptographical unit is used to decrypt data for loading and to encrypt data for storage. However, this means that only the external memory is protected against unauthorized reading. In addition, the use of error-correcting coding when storing the data allows errors or data manipulation to be identified and corrected if appropriate.

As soon as the data have been loaded from the external memory for processing, they are no longer protected and can be manipulated by an attack along the route to the arithmetic and logic unit. It is likewise conceivable for there to be errors in the hardware which result in changes to the data. Correct processing of the data in the arithmetic and logic unit is then no longer ensured. By way of example, manipulations include specifically irradiating the circuit arrangement with a laser, which results in changes to bits. In addition, data signals can be monitored by tapping, or altered, by placing contact needles onto their data paths. This practice is also called "probing".

The aim of previously used protective measures in hardware and software is to make attacks more difficult or to correct errors. Some security concepts involve errors not being prevented but rather being identified, and suitable countermeasures being initiated for an identified error. Examples of protective measures which may be mentioned here are the aforementioned use of error-correcting codes in a cryptographical unit and bus encryption methods for the data path between the external memory and the arithmetic and logic unit. All of these protective measures relate only to portions of the circuit arrangement and therefore restrict the protected area. With previously known methods, the protection against the actual processing of the data ends even before the arithmetic and logic unit. It would be desirable to protect the data which are to be processed, if possible, from the memory up to their actual processing within the arithmetic and logic unit.

To limit complexity, it would be advantageous if the scope of protection can vary, so that, by way of example, only particularly important routines or sensitive data are protected. This flexibility is not provided in the aforementioned protective measures, but rather these measures protect all the data to the same extent.

SUMMARY OF THE INVENTION

A circuit arrangement for secure data processing for program data with a protected data record. An internal memory provides a protected data record having instruction words and at least one first check word associated with the instruction words. An arithmetic and logic unit has an input coupled to the internal memory and outputs the at least one first check word from the applied protected data record. A checking apparatus has an input coupled between the internal memory and the arithmetic and logic unit, and allocates at least one second check word to the instruction words in the protected data record. A comparison apparatus has respective inputs coupled to the checking apparatus and the arithmetic and logic unit, and compares the at least one first check word with the at least one second check word and outputs an alarm signal when the at least one first check word does not match the at least one second check word.

A method for secure data processing for program data with a protected data record. The method includes the steps of providing a data record which is to be protected and which contains instruction words, allocating at least one first check word to the instruction words using a first allocation method, allocating at least one second check word to the instruction words using a second allocation method, comparing the at least one first check word with the at least one second check word, and performing an alarm action if the at least one first check word does not match the at least one second check word.

BRIEF DESCRIPTION OF THE DRAWINGS

The invention is explained below using exemplary embodiments with reference to the drawing, in which.

DETAILED DESCRIPTION OF PREFERRED EMBODIMENTS OF THE INVENTION

Figure 1:
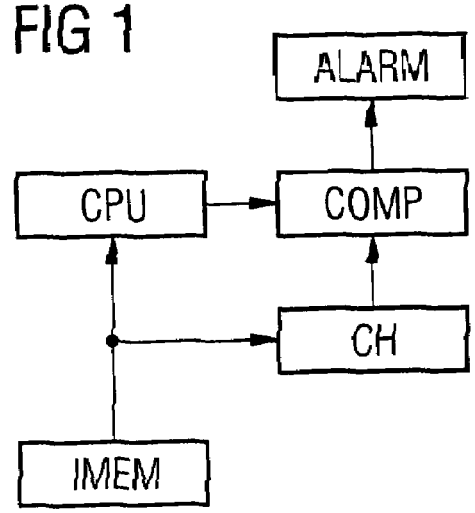
FIG. 1 shows a simple exemplary embodiment of the inventive circuit arrangement.

It is an object of the invention to provide a circuit arrangement for flexible protected data processing for program data.

The circuit arrangement comprises an internal memory which is designed to provide a protected data record having instruction words and at least one first check word associated with the instruction words. An internal memory is a buffer or buffer-store, for example. Merely a bit would also be sufficient to provide a data word. In addition, the circuit arrangement comprises an arithmetic and logic unit, whose input is coupled to the internal memory and which is designed to output the first, at least one check word from an applied protected data record, and a checking apparatus, whose input is coupled between the internal memory and the arithmetic and logic unit and which is designed to allocate a second check word to the instruction words in the protected data record. The circuit arrangement also comprises a comparison apparatus whose input is coupled to the checking apparatus and the arithmetic and logic unit and which is designed to compare the first check word with the second check word and to output an alarm signal if the first check word does not match the second check word.

In addition, a corresponding method for secure data processing is specified.

The comparison of the previously allocated first check word with a second check word which is generated from the protected data record while it is being executed allows a change to the data record to be identified. This because a change to the data record is accompanied by a change to the second check word, which means that the match is no longer ensured.

In circuit arrangements with a decoding apparatus, the input of the checking apparatus is advantageously coupled both upstream and downstream of the decoding apparatus between the internal memory and the arithmetic and logic unit. This allows instruction words to be checked at any intervals, at various points along the data path, and suitable countermeasures to be taken if appropriate.

The check words can be allocated through transformation and/or linear superposition of the instruction words in the protected data record, with various orders being conceivable in this context. The allocation maps the instruction words in the protected data record onto a check word.

If the protected data record is a linearly executable series of instruction words, the allocation can be effected by adding or Exclusive-ORing the instruction words, for example. The resultant check word is explicit in this case. If the data record to be protected has jump points or branches as a result of case distinctions, however, and the check words are to be allocated in a similar fashion, various check words are produced as a result of the branches. Each check word is dependent on the case distinction or the intermediate results which underlie the case distinction.

By calculating a plurality of possible check words, it is also possible to protect more complicated program sections with branches. However, executing the series of instruction words which is actually to be executed results only in a second check word, which needs to be compared with the first check words. Alternatively, a further first check word can be calculated at jump or branch points, so that a data record for which it is possible to calculate a plurality of possible first check words is divided into small data records which are each allocated a first check word.

The first check words associated with the instruction words in the protected data record are generated by first of all simulating the functionality of the checking apparatus in software. The simulation does not just cover the actual functionality of the checking apparatus, but rather also indirectly includes the other elements of the circuit, which transform the original program data and forward them as input data for the checking apparatus. This means that the result of the simulation is likewise dependent on the components which are connected upstream of the checking apparatus, particularly the decoding apparatus.

Besides the above-described protection-related form of the circuit arrangement, the latter naturally also has the components for the actual data processing which are known from conventional circuit arrangements. These include an arithmetic and logic unit which is suitable for processing the program data. In addition, the internal memory is designed to store the program data and to provide them for the data processing. Advantageously, an external memory is provided which is protected against attacks by a cryptographical unit. The integration of said circuit arrangement also serves to protect it, since this makes it more difficult to attack.

Such a circuit arrangement may be used in a chip card, for example.

The inventive method for secure data processing for program data with a protected data record comprises providing a data record which is to be protected and which contains instruction words and allocating at least one first check word to the instruction words using a first allocation method, furthermore allocating at least one second check word to the instruction words using a second allocation method and comparing the at least one first check word with the at least one second check word, and performing an alarm action if the at least one first check word does not match the at least one second check word.

Advantageously, the protected data record is generated by calculating at least one first check word from an unprotected data record and inserting this check word into the program data. This is advantageously done in anticipation of the actual program processing by a software simulation simulates the functionality of the actual circuit arrangement.

The unprotected data record is first of all selected from said program data as an area which is particularly in need of protection. This is normally done by a software tool available to a user, which the user can use to select and mark areas for protection. Automated selection, for example standardized routines, is also conceivable, however.

Furthermore, the protected data record may additionally be provided in transformed form. This makes it possible to generate the second check word from the data record and/or from the transformed data record, which increases the protection.

If jump points or branches arise in the data record which is to be protected, the calculation of the first check word is not explicit. In this case, it is advantageous to calculate the alternatives which may arise from the various paths of data processing as a result of a case distinction. For the purposes of checking, the alternatives are compared with the second check word produced from the data processing to determine whether one of them matches it. Alternatively, it is also possible to generate and compare additional first and second check words at the jump points, which simplifies the practice.

A larger part is played in the method by the software component, which calculates the first check words in anticipation of the data processing by means of simulation, and the hardware component, which generates the second check words during the actual execution of the program data. When the software and hardware components are interacting correctly, the same check words should be generated by both calculation methods, which naturally differ merely on account of the differences among the components. This ensures the protection for the data records which are to be protected.

FIG. 1 shows a simple form of the inventive circuit arrangement. This comprises the fundamental blocks for processing program data 1. An internal memory IMEM and an arithmetic and logic unit CPU which are coupled to one another are provided. In addition, a checking apparatus CH and a comparison apparatus COMP are provided. The input of the checking apparatus CH is coupled between the internal memory IMEM and the arithmetic and logic unit CPU. The comparison apparatus COMP is connected downstream of the arithmetic and logic unit CPU and the checking apparatus CH.

Figure 2:
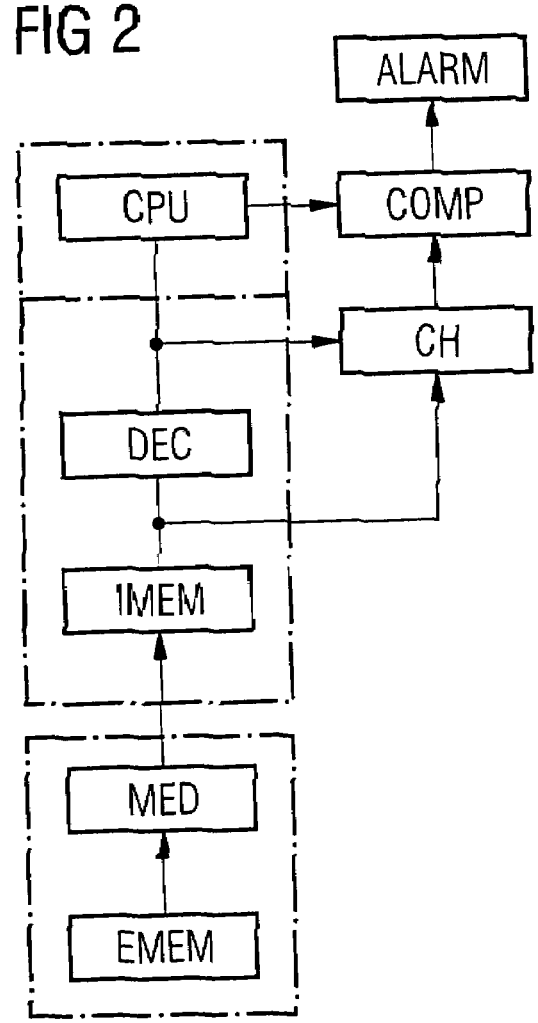
FIG. 2 shows an alternative, more complex exemplary embodiment of the inventive circuit arrangement.

FIG. 2 shows an exemplary embodiment of the inventive circuit arrangement which has further elements on the basis of the form shown in FIG. 1. First, an external memory EMEM is provided which is connected upstream of the internal memory IMEM via a cryptographical unit MED. In addition, a decoding apparatus DEC is coupled between the internal memory IMEM and the arithmetic and logic unit CPU. The input of the checking unit CH is coupled both between the internal memory IMEM and the decoding apparatus DEC and between the decoding apparatus DEC and the arithmetic and logic unit CPU, in order to protect the path between the internal memory IMEM and the arithmetic and logic unit CPU at various points, and hence to be able to restrict an attack if appropriate.

It should be pointed out that the invention also comprises forms which comprise a combination of the features in FIGS. 1 and 2.

The operation of the exemplary embodiments is explained below with reference to FIGS. 3 to 6.

In conventional processing, program data 1 are stored in the external memory EMEM and are loaded into the internal memory IMEM after having been decrypted by means of the cryptographical unit MED. The program data 1 are made up of a series of instruction words which are executed by the arithmetic and logic unit CPU. The order of execution does not have to correspond to the order of the instruction words. Particular instruction words may initiate jumps. For case distinctions whose result is dependent on a hitherto calculated intermediate result, it is also conceivable to have a plurality of possible entry points.

It should be expressly pointed out that the expression "instruction words" involves not just instructions in the narrower sense, for example for performing functions, but also data which are the argument for a function or an instruction, for example. The "instruction words" include any type of data which are accessed by the arithmetic and logic unit CPU.

For the purpose of execution, the instruction words which are held in the internal memory IMEM are loaded into the arithmetic and logic unit CPU in the order of execution. The instruction words are converted by means of the decoding apparatus DEC into instruction words which are directly suitable for the arithmetic and logic unit CPU to process. This decoding is tuned specifically to the requirements and hardware architecture of the arithmetic and logic unit CPU. The form of the decoding apparatus DEC and the arithmetic and logic unit CPU are in tune with one another in order to allow the data processing. With different forms of the circuit arrangement which deliver the same result when processing the same program data 1, the decoded instruction words which are output by the decoding apparatus DEC may very well differ even though they ultimately produce the same result.

Figure 3:
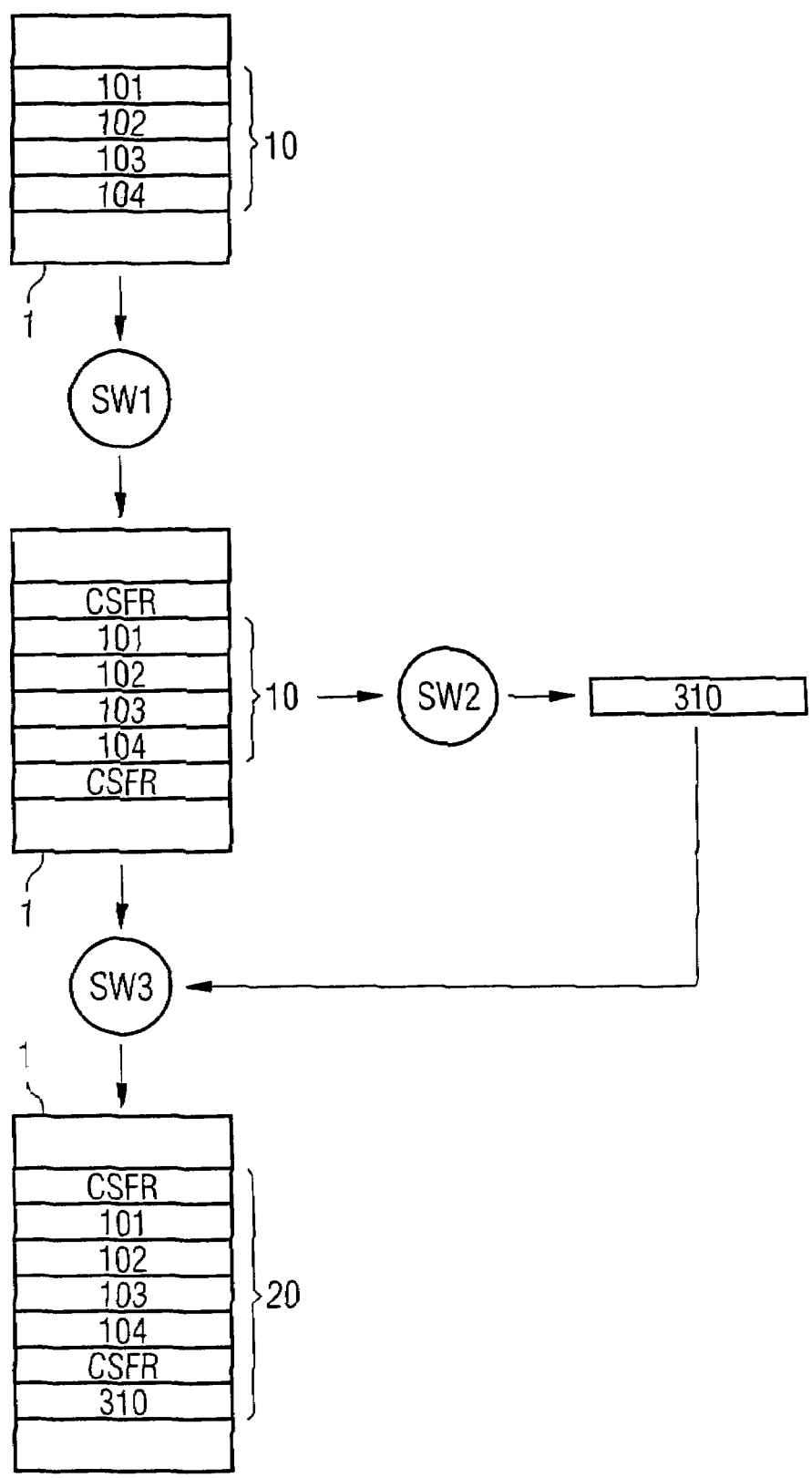
FIG. 3 shows the basic flow of the method for generating protected program data.

FIG. 3 shows how the program data 1 are altered such that they are suitable for secure data processing in a circuit arrangement as shown in FIG. 2.

The method is flexible in terms of the desired scope of protection for the program data 1. Relatively high complexity allows very comprehensive protection to be ensured for the program data 1, whereas low complexity is used to protect only particularly sensitive areas. Since the protection is always also associated with complexity which accompanies both the production of redundant data and additional computation complexity for processing the instruction words in the circuit arrangement, it is necessary to decide the extent to which the program data 1 are to be protected. This decision is down to a user who is to select the areas to be protected in the program data 1. By way of example, a data record 10 which is to be protected is marked within the program data 1. The data record to be protected comprises a portion within the program data with the instruction words 101, 102, 103, 104.

The user is provided with a software tool which he uses to mark the program data areas 10 which are to be protected. The marking is carried out by inserting a start and end marker CSFR into the program code, for example. This step is identified by the circle SW1 in FIG. 3. A first check word 310 is generated from the data record 10 which is to be protected, within the markers CSFR, by the software tool, in this case indicated by the circle SW2. The first check word 310 is inserted by the software tool into the program data 1, so that the latter comprise a protected data record 20. This step is elucidated by the circle SW3. The operations in the arithmetic and logic unit CPU during execution of the protected data record 20 match that for the data record 10 which is to be protected, since they contain the same succession of instruction words 101, 102, 103, 104. In addition, the protected data record 20 contains the markers CSFR and the first check word 310, which is able to identify the protected data record 20 during the later execution of the program data 1 in the arithmetic and logic unit CPU and to extract and provide the associated first check word 310 from the arithmetic and logic unit CPU for the comparison. As FIG. 3 shows, the first check word 310 does not have to be inserted into the program data 1. Rather, there may also be just an address reference indicating the location in the external memory EMEM at which the first check word is stored. This practice allows the first check word 310 to be read only during the actual later comparison, for example.

Figure 4:
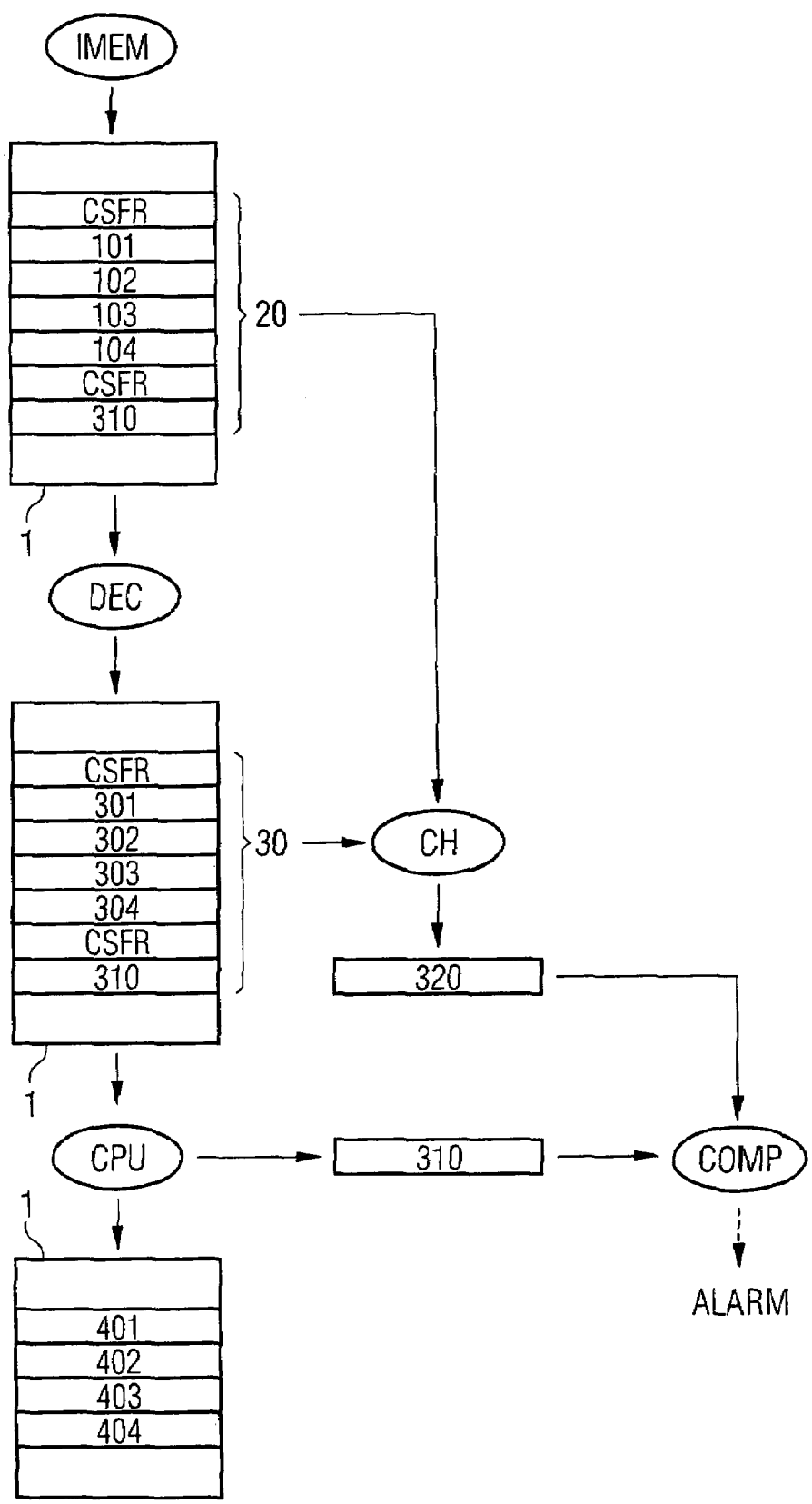
FIG. 4 shows the flow of the method for the protected processing of the program data in the circuit arrangement.

FIG. 4 shows the processing of the protected data record 20, which has been generated in line with the method in FIG. 3.

The program data 1 which have been generated by the software tool are stored in the external memory EMEM in the circuit arrangement. If the data are to be stored in encrypted form, the encryption is formed by the cryptographical unit MED upon storage. To execute the program, the program data 1, or a portion thereof, are loaded via the cryptographical unit MED into the internal memory IMEM, which is accessed by the arithmetic and logic unit CPU.

The protected data record 20 is also provided in the internal memory IMEM for execution. During normal processing of the exemplary embodiment which is shown in FIG. 2, the program data 1 are first decoded by the decoding apparatus DEC, so that the instruction words 101, 102, 103, 104 are transformed into instruction words 301, 302, 303, 304 which are suitable for processing in the arithmetic and logic unit CPU. The transformed instruction words 301, 302, 303, 304 are successively loaded into the arithmetic and logic unit CPU and are executed there. The redundant information, such as the markers CSFR and the first check word 310, which are of no significance to the execution are ignored for the actual data processing by the arithmetic and logic unit CPU. The arithmetic and logic unit CPU executes the actual instructions and, if appropriate, generates control instructions 401, 402, 403, 404 and outputs them to further circuit components.

Processing of the program data 1 by the circuit arrangement shown in FIG. 1 differs from the processing described above by virtue of the transformation of the instruction words 101, 102, 103, 104 being dispensed with, since no decoding apparatus DEC is provided.

The checking apparatus CH taps off the instruction words 101, 102, 103, 104, 301, 302, 303, 304 which are present between the internal memory IMEM and the arithmetic and logic unit CPU. In the form of the circuit arrangement shown in FIG. 2 or the illustration in FIG. 4, said arithmetic and logic unit is provided both upstream and downstream of the decoding apparatus DEC. Further or alternative points for tapping off the data along the data path are also conceivable, however, in order to provide multiple protections even for the data path in its elongate extent.

The checking apparatus CH is designed such that it can identify the protected data record 20 within the program data 1. This is done by the markers CSFR, which indicate the start and end of the protected data record 20. The same applies in corresponding fashion for the transformed protected data record 30. The checking apparatus CH calculates a second check word 320 from the protected data record 20 and/or the transformed protected data record 30. This is done by means of linear superposition and transformation, for example.

A simple example is intended to clarify this. The data record 20 to be protected is assumed to be the following series of instructions, excluding the markers, for example: ADD, SUB. Following decoding, the following sequence is available; 47, 56. The checking apparatus CH is suitable for extracting both the first sequence ADD, SUB and the second sequence 47, 56 by identifying the enclosing markers CSFR. Transformation is used to convert the sequence 47, 56 into the sequence 8844, 00FF, for example. Advantageously, all the bits are dependent on one another in this transformation, which means that errors are not eliminated. The second check word 320 is now generated from 8844 and 00FF using an exclusive-OR operation, which results in 88BB. A further transformation can produce a similar effect for the series 47, 56. Even at this point it is possible to check whether the same second check word 320 can be generated from the protected data record 20 and the transformed protected data record 30 or whether these are dependent on one another in a defined fashion. If this is not the case, an attack can be assumed between the two tap points. It goes without saying that it is also possible to generate a plurality of second check words in the manner stated and to forward all of them for further processing and to compare them with the first check word 310.

The arithmetic and logic unit CPU is designed to output the first check word 310 associated with the protected data record 20, 30. A comparison apparatus COMP is used to compare the first check word 310 and the second check word 320 with one another. The first check word 310 can also be output, by way of example, by virtue of the arithmetic and logic unit referring to or outputting an address in the memory at which the first check word 310 is stored. If the first and second check words 310, 320 do not match, an alarm signal ALARM can be output.

The comparison may take diverse forms. By way of example, it can be performed using a routine which compares the first check word 310 stored in the memory with the calculated second check word 320. The first and second check words 310, 320 do not have to be identical, but rather may be converted into one another through mapping.

The reactions to the alarm signal ALARM can be diverse. Besides simple signaling of the alarm, the alarm signal can also be fed back to the CPU and prompt various actions. By way of example, these involve disconnecting the circuit arrangement or shutting it down and starting it up again or processing the program data 1 again.

In the case of linearly executable series of instruction words, implementing the method described is simple. It becomes more complicated as soon as the data record which is to be protected comprises jumps or case distinctions. This is illustrated in FIGS. 5 and 6 by way of example.

Figure 5:
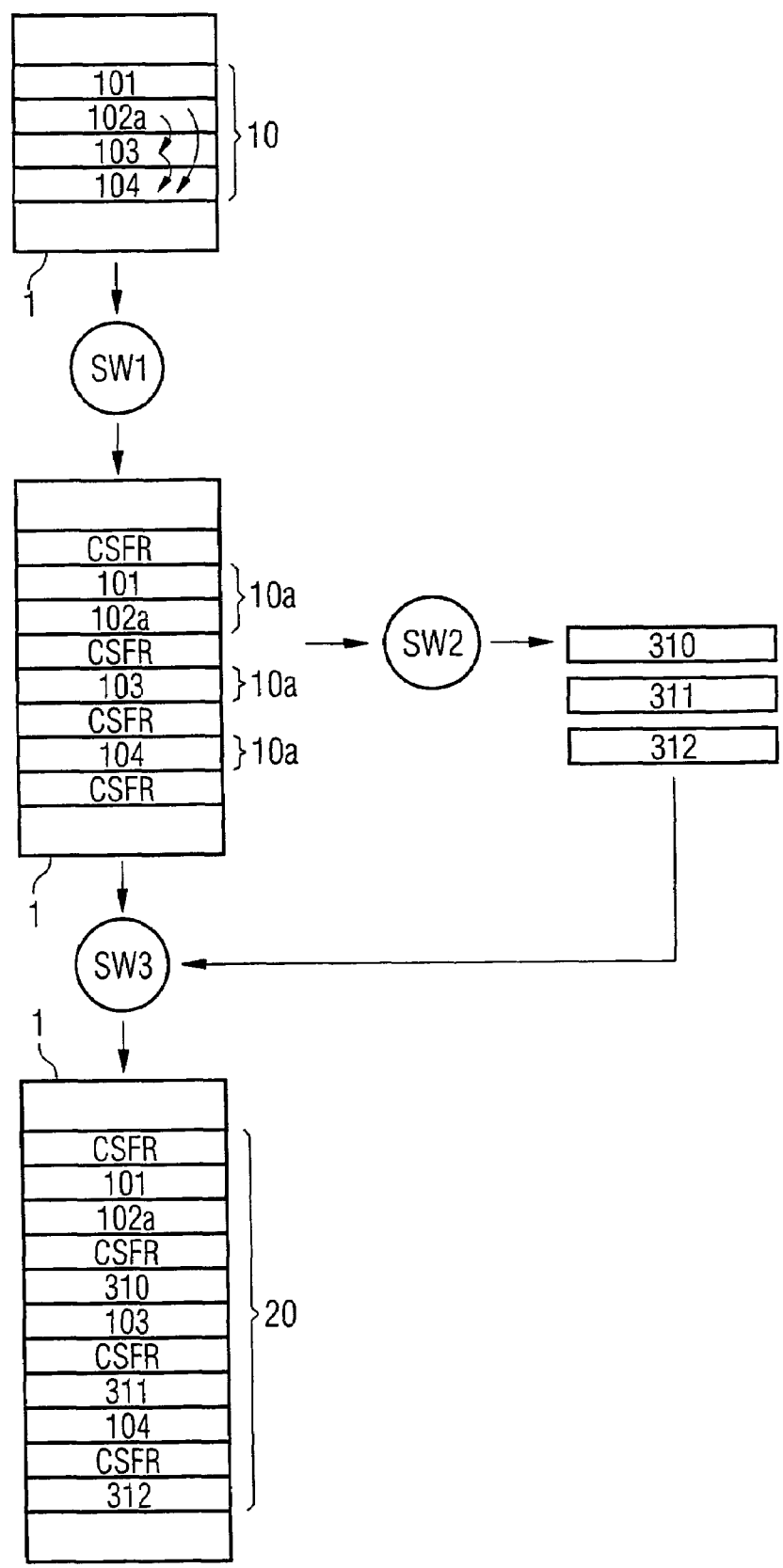
FIG. 5 shows the basic flow of the method for generating protected program data with branch points.

FIG. 5 shows the creation of a protected data record 20 which comprises a series of instruction words within which a jump occurs. The text below explains the extent to which this practice differs from the practice already described for FIG. 3 for generating protected program data 1.

The instruction word 102a identifies a case distinction which allows alternative execution for the further instruction words. The alternatives are indicated by arrows. First, it is possible to execute the series comprising the instruction words 101, 102a, 103, 104 linearly. Alternatively, the result of a jump is that the series 101, 102a, 104 is executed. Depending on the resultant succession of executable instruction words, two alternative first check words would be produced. Since the program data 1 usually still provide no indication of which path or which case distinction is chosen for the later processing, both alternatives would need to be calculated and inserted into the protected data record 20. This practice would complicate the later comparison, which means that the following practice is chosen. The data record 10 to be protected is divided into a plurality of small data records 10a which respectively comprise the instruction words between jump or branch points. It is thus possible to allocate a first check word 310, 311, 312 to each small data record 10a before or after a case distinction, said first check word being inserted into the program data in suitable fashion. In this way, the data record defined by the user is split into various small data records 10a which each have an associated check word 310, 311, 312.

Figure 6:
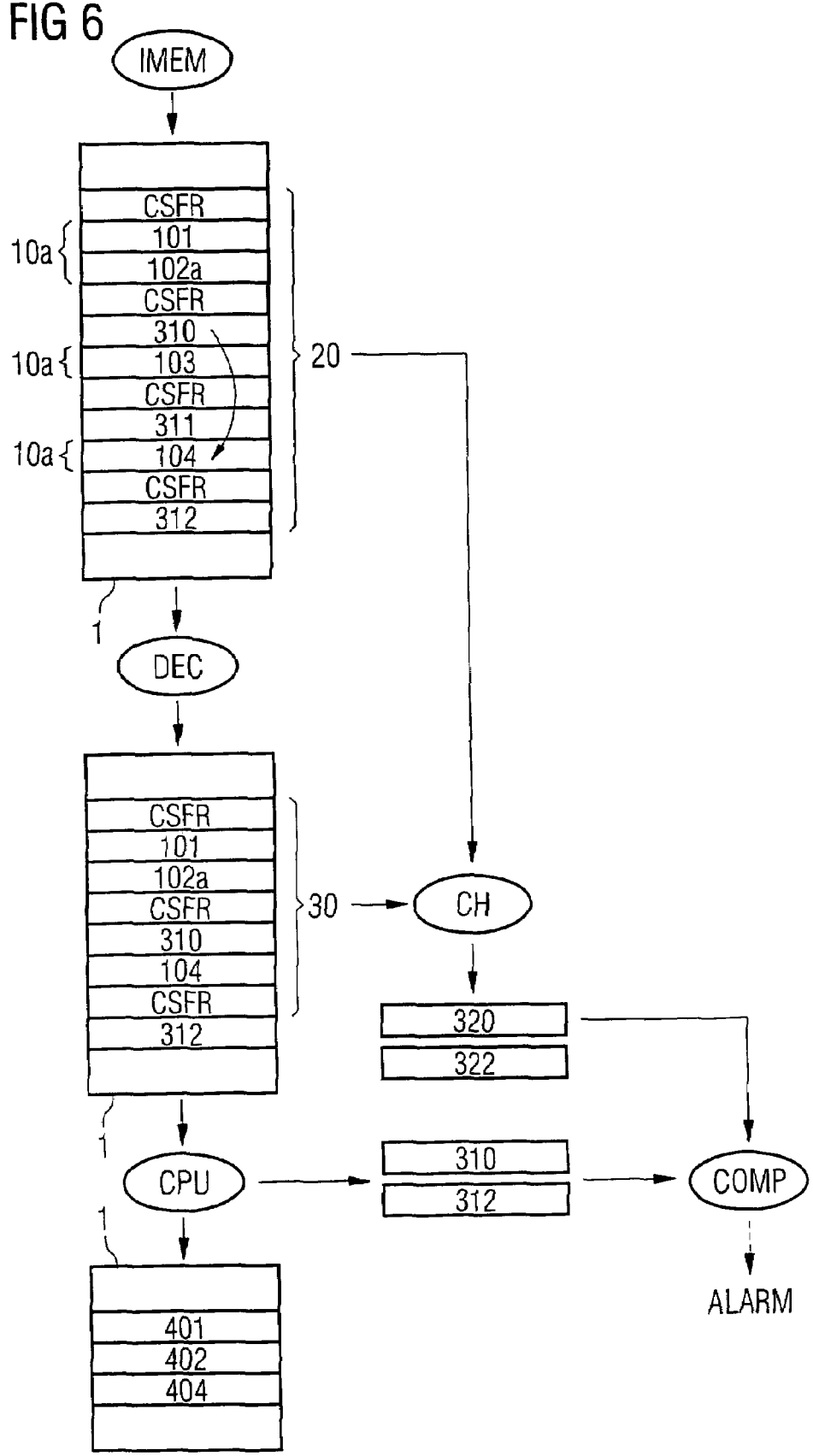
FIG. 6 shows the flow of the method for the protected processing of the program data with branch points in the circuit arrangement.

FIG. 6 shows the resultant flow in the data processing. In principle, the flow corresponds to that in FIG. 4. The text below will therefore explain only the differences.

When the data record is executed, the case distinction 102a results in a jump, so that the instruction words 101, 102a, 104 are executed by supplying them to the arithmetic and logic unit CPU via the decoding apparatus DEC. The protected data record 20 is divided by the markers CSFR into three small data records 10a, only the first and third of which are executed as a result of the jump.

From this series of instruction words which is present at the tap points, the checking apparatus CH calculates the resultant second check words 320, 322 for the small data records 10a.

The arithmetic and logic unit CPU extracts the first check words 310, 312 associated with the executed small data records 10a from the executed program data 1.

The comparison apparatus COMP compares the first and second check words 310, 312, 320, 322 and outputs an alarm signal ALARM if they do not match.

Alternatively, it is possible not to divide the data record 10 which is to be protected and to calculate all possible first check words 310 which can arise for all possible instruction word series as a result of jump and branch points.

The data processing in comparison with FIG. 6 then changes such that the arithmetic and logic unit extracts the possible first check words 310 and the checking apparatus checks whether one of these matches the generated second check word 320.

It is likewise conceivable to determine the first check word on the basis of the chosen execution and to compare it with the calculated second check word.

In a similar manner to jumps or case distinctions, interrupts can be protected. In this case, the hitherto calculated intermediate values are stored in a stack and are protected in the manner explained after the program processing resumes.

What is claimed is:

1. A circuit arrangement for secure data processing for program data with a protected data record, comprising:
   an internal memory which provides a protected data record having instruction words and at least one first check word associated with the instruction words;
   an arithmetic and logic unit having an input coupled to the internal memory and which outputs the at least one first check word from the applied protected data record;
   a checking apparatus having an input coupled between the internal memory and the arithmetic and logic unit and which allocates at least one second check word to the instruction words in the protected data record; and
   a comparison apparatus having respective inputs coupled to the checking apparatus and the arithmetic and logic unit and which compares the at least one first check word with the at least one second check word and outputs an alarm signal when the at least one first check word does not match the at least one second check word.

2. The circuit arrangement of claim 1, wherein the allocation of the first and second check words comprises transformation and/or linear superposition of the instruction words in the protected data record.

3. The circuit arrangement of claim 1, wherein the allocation of the at least one second check word by the checking apparatus from the protected data record is simulated in software.

4. The circuit arrangement of claim 1, wherein the arithmetic and logic unit processes program data which comprise at least one protected data record.

5. The circuit arrangement of claim 1, wherein the circuit arrangement is integrated.

6. The use of the circuit arrangement of claim 1 in a chip card.

7. The circuit arrangement of claim 1, further comprising a decoding apparatus coupled between the internal memory and the arithmetic and logic unit and which transforms the instruction words applied to its input.

8. The circuit arrangement of claim 7, wherein the input of the checking apparatus is coupled at least between the decoding apparatus and the arithmetic and logic unit in order to tap off the transformed instruction words and/or is coupled between the internal memory and the decoding apparatus in order to tap off the instruction words, and
   wherein the checking apparatus allocates the at least one second check word to the instruction words in the protected data record and/or to the transformed instruction words in the protected data record.

9. The circuit arrangement of claim 1, further comprising an external memory connected upstream of the internal memory and which stores and provides the program data.

10. The circuit arrangement of claim 9, wherein a cryptographical unit is coupled between the internal memory and the external memory, and the cryptographical unit decrypts program data held in the external memory when the program data are loaded and encrypts the program data when they are stored.

11. The circuit arrangement of claim 1, wherein the allocation of the second check word depends on a succession of instruction words within the protected data record, which succession is to be processed by the arithmetic and logic unit.

12. The circuit arrangement of claim 1, wherein the succession which is to be processed by the arithmetic and logic unit is dependent on jumps and branches within a series of instruction words in the protected data record.

13. The circuit arrangement of claim 11, wherein the arithmetic and logic unit outputs more than one first check word, and the checking unit compares whether one of the plurality of first check words matches the second check word.

14. A circuit arrangement for secure data processing for program data with a protected data record, comprising:
   an internal memory means for providing a protected data record having instruction words and at least one first check word associated with the instruction words;
   an arithmetic and logic means, which has an input coupled to the internal memory, for outputting the at least one first check word from the applied protected data record;
   a checking means, which has an input coupled between the internal memory and the arithmetic and logic unit, for allocating at least one second check word to the instruction words in the protected data record; and
   a comparing means, which has respective inputs coupled to the checking apparatus and the arithmetic and logic unit, for comparing the at least one first check word with the at least one second check word and for outputting an alarm signal when the at least one first check word does not match the at least one second check word.

* * * * *

UNITED STATES PATENT AND TRADEMARK OFFICE
CERTIFICATE OF CORRECTION

PATENT NO. : 7,574,631 B2  Page 1 of 1
APPLICATION NO. : 11/355907
DATED : August 11, 2009
INVENTOR(S) : Franz Klug et al.

It is certified that error appears in the above-identified patent and that said Letters Patent is hereby corrected as shown below:

At col. 9, line 36, in Claim 3, delete "anangement" and insert -- arrangement --, therefor.

At col. 9, line 40, in Claim 4, delete "anangement" and insert -- arrangement --, therefor.

At col. 9, line 44, in Claim 5, delete "anangement" and insert -- arrangement --, therefor.

At col. 10, line 1, in Claim 8, delete "anangement" and insert -- arrangement --, therefor.

At col. 10, line 24, in Claim 12, delete "anangement" and insert -- arrangement --, therefor.

At col. 10, line 28, in Claim 13, delete "anangement" and insert -- arrangement --, therefor.

Signed and Sealed this

Twenty-seventh Day of October, 2009

David J. Kappos
*Director of the United States Patent and Trademark Office*